United States Patent Office 3,527,029
Patented Sept. 8, 1970

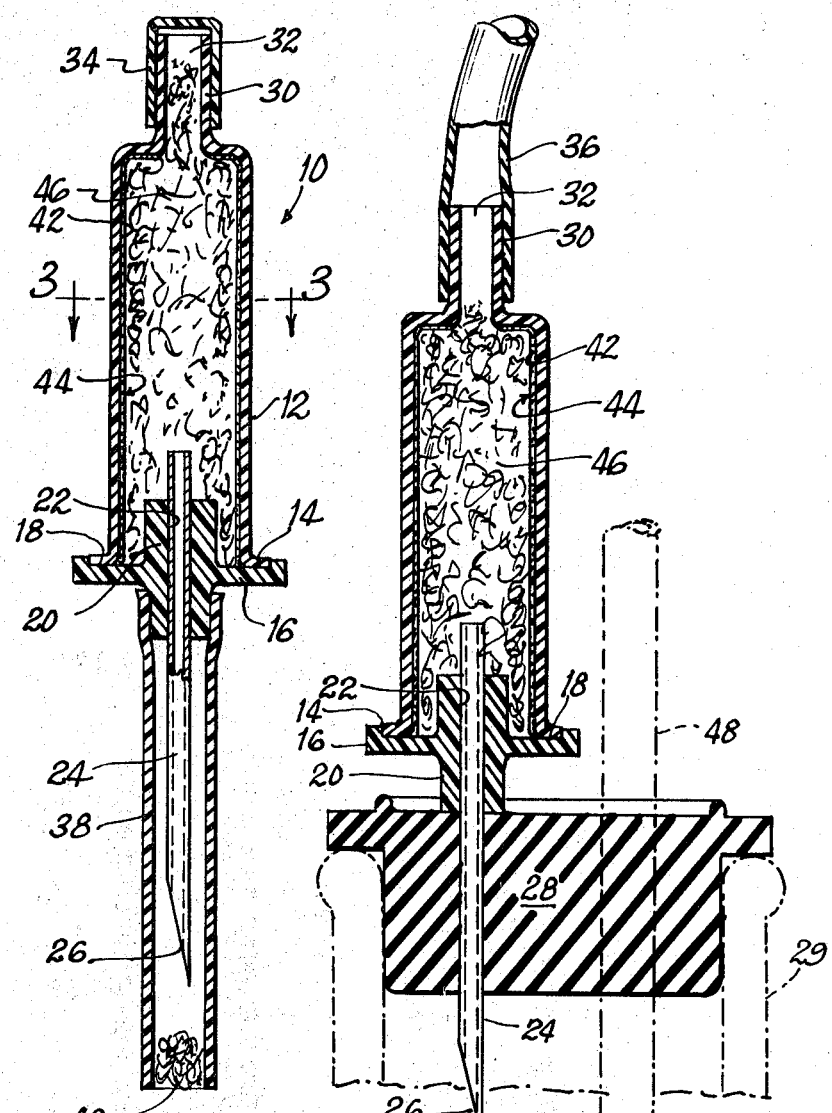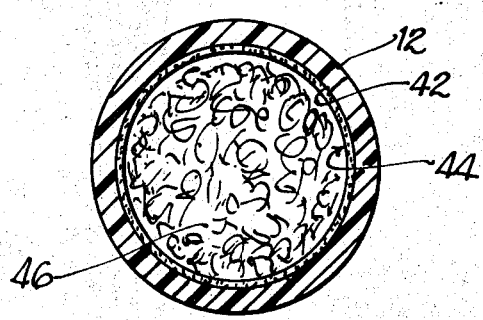

3,527,029
FILTER DEVICE FOR THE PASSAGE OF AIR INTO A CONTAINER
Leon I. Kirschner, Skokie, Ill., assignor to K-N Enterprises, Inc., Skokie, Ill., a corporation of Illinois
Filed Oct. 14, 1968, Ser. No. 767,095
Int. Cl. A61n 5/14; B01d 29/08
U.S. Cl. 55—385                                           3 Claims

ABSTRACT OF THE DISCLOSURE

A device for passage of air comprising a cylinder filled with a fibrous filter medium including an adhesive coating on the inside surface of the cylinder whereby the filter medium is bonded to the cylinder and including a cannula extending into a boss at the end of the cylinder.

BRIEF SUMMARY OF THE INVENTION

In the transfer of a sterile biological preparation or fluid in a sterile closed container, a given volume of the sterile fluid is displaced by introducing air or gas into the closed container to cause the sterile fluid to move and to pass out of said container to other containers for use. Where air or gas is the medium through which to displace the sterile fluid, it is imperative that the gas or air introduced be sterile, otherwise the sterile biological preparation or fluid will become contaminated. Various devices are on the market for accomplishing this objective, however, they have certain shortcomings which this invention overcomes. For example, a device is used which contains a filter medium but the filter medium is not anchored or permanently fixed in the enclosure in which it is housed and as a consequence of this condition the filter medium shifts under conditions of unequal pressure, i.e., when the filter medium is used in an evacuated container the entire medium filter shifts in the direction of the evacuated container. When the filter medium is used with a container under positive pressure, the filter medium shifts away from the container containing the positive pressure. To offset this condition, the filter medium can be tightly tamped or packed into the housing, however, this leads to a high degree of gas resistance rendering the entire device difficult to employ. Also in connection with said prior art devices, the air or gas is wicked, that is, it passes between the inside wall of the housing and the filter medium and as a consequence the air or gas does not pass through the filter medium and hence is introduced into the sterile contained liquid in a non-sterile condition.

The foregoing objectionable features are obviated by this invention which provides for the adhesion of the filter medium to the inside wall of the housing, thereby obviating the necessity of tamping or packing the filter medium and also removing the danger of wicking or bypassing the filter medium.

Other objects will become apparent as this description progresses.

BRIEF DESCRIPTION OF THE DRAWINGS

In the drawings:
FIG. 1 is a central cross-sectional view of the device forming this invention.
FIG. 2 is a sectional view of the device connected to a container containing the sterile fluid to be displaced.
FIG. 3 is an enlarged sectional view taken on line 3—3 of FIG. 1.

The device forming this invention is generally designated by the numeral 10 and includes a housing 12 formed of a rigid plastic material, glass, or the like. The housing has an open front end provided with an annular flange 14 to which is fixedly secured an end member 16 having an annular recessed portion 18 into which the flange 14 seats and is fixedly secured. The end member 16 has a central boss 20, a portion of which extends into the housing 12 and a portion of which extends outwardly thereof. The central boss 20 has a central bore 22 which receives and retains a cannula 24, a portion of which extends into the housing and a portion of which extends forwardly of the housing. The cannula has a tapered and sharpened front end 26 which is adapted to be inserted into the rubber closure plug 28, as shown in FIG. 2, which seals the top of the container 29, containing a sterile liquid. The cannula 24 is the connector which connects the housing 12 to the container.

The rear of the housing 12 has a reduced end 30 having an opening 32. Detachably secured to the rear end 30 of the housing is a cap 34 which closes the opening 32. The reduced end 30 serves as a hose fitment, as shown in FIG. 2, to which a flexible connector or hose 36 is connected. The flexible connector 36 may be a tubing. The opposite end of this connector 32 is connected to a device, not shown, for pumping a gas, such as air or the like, into the housing 12, or it may be connected to an evacuating pump for exhausting the air from the container 29, or it may be connected to a compressed cylinder gas. Prior to connecting the flexible connector 32 to the reduced end 30 of the housing, the cap 34 is attached to the reduced end 30 to prevent entrance of any gasses into the housing 12. Likewise, the exposed portion of the cannula 24 is enclosed by a tubular guard 38 which is detachably secured to the front end of the boss 20. A wad of cotton or the like 40 closes the exposed end of the guard 38.

The inside wall 42 of the housing 12 is coated with an adhesive coating 44, such as organic cement, water soluble or insoluble, or solvents reacting with the housing 12 if made of plastic. Positioned inside the housing is a filter medium generally designated by the numeral 46 which by virtue of the adhesive coating 44 becomes bonded to the inside wall 42 of the housing 12. The filter medium may be cotton, rayon, felt, polyethylene or polyurethane foam, or the like. The filter medium is not packed tightly inside the housing so as to prevent the passage of the gas. By virtue of securing the filter medium to the inside wall of the housing the filter medium will be prevented from shifting or moving axially within the housing irrespective of the positive or negative pressure of the gas passing through the housing. Further, the bonding of the filter medium adjacent the inside wall of the housing to said inside wall will prevent the wicking or passage of the gas between the filter medium and the inside wall of the housing. Thus, all of the gas entering the housing will have to pass into the interior of the filter medium and not around the filter medium. With all of the gas passing through the filter medium, the gas is rendered sterile, therefore, all of the gas passing into the housing 12 through the flexible connector 36 and through the cannula 24 into the container 29 containing the sterile liquid to be displaced is sterile. Also, the filter material will permit the gas to pass through at a uniform rate, which would not be possible if the filter medium was packed tightly or was permitted to shift or move within the housing 12.

The displaced gas in the container 29 will pass from the container through a tubing 48 which has been connected or inserted into the closure plug 28 of the container. The tubing in turn is connected to another bottle or container (not shown into which it is desired to transfer some of the liquid from container 29.

The device of this invention permits a sterile exchange of gases through the device between the atmosphere and a sterile closed container, to displace a given volume of a sterile fluid in the sterile closed container by introducing air or gas through the device, thereby rendering sterile the introduced gas or air used for the liquid displacement. The device may be employed with a container that is evacuated, i.e., with negative pressure and/or may be employed with a container under atmospheric or positive pressure. It may also be used in connection with instruments or electronic devices where it is necessary to render an air stream of gas dust-free, bacteria-free and sterile. The device may be used wherever a gas exchange is required under sterile conditions.

What is claimed is:

1. An apparatus for the passage of air into a container containing a sterile liquid comprising, an elongated cylindrical housing having end walls respectively provided with central openings, a tube connected to one end wall at one said opening and an apertured plug boss integral with the other end wall and extending into and out of the cylindrical housing to define the other opening, a cannula secured at one end by the apertured plug boss and extending outwardly therefrom to a tapered sharp end, an adhesive coating covering the inside wall surface of said housing a fibrous filter loosely packed and filled said housing, said filter being bonded by said adhesive coating to the inside wall of said housing preventing axial movement of the filter in the housing.

2. An apparatus as set forth in claim 1 in which the filter is made of a cotton material.

3. An apparatus as set forth in claim 1 in which a shield is detachably secured to enclose the cannula.

References Cited
UNITED STATES PATENTS

| | | | |
|---|---|---|---|
| 3,272,192 | 9/1966 | Jensen et al. | 55—524 |
| 2,108,283 | 2/1938 | Drew et al. | 55—491 |
| 3,157,481 | 11/1964 | Bujan | 55—420 |
| 3,193,993 | 7/1965 | Barton et al. | 55—385 |
| 3,359,977 | 12/1967 | Burke | 55—420 |

FRANK W. LUTTER, Primary Examiner

B. NOZICK, Assistant Examiner

U.S. Cl. X.R.

55—514; 128—214